United States Patent Office 3,065,765
Patented Nov. 27, 1962

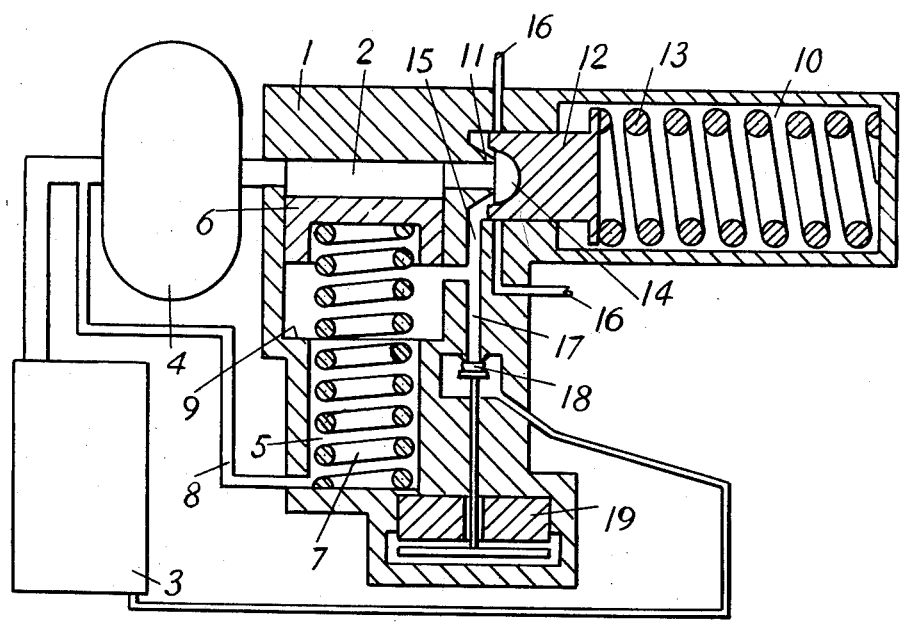

3,065,765
DEVICE FOR INTERMITTENTLY SUPPLYING LUBRICANTS
John Michael Crispin Young, Solihull, England, assignor to Joseph Lucas (Industries) Limited, Birmingham, England
Filed Dec. 4, 1961, Ser. No. 156,679
Claims priority, application Great Britain Dec. 8, 1960
1 Claim. (Cl. 137—624.14)

The object of this invention is to provide in a convenient form means for intermittently supplying lubricant under pressure to a pump or other machine.

Means in accordance with the invention comprises a chamber, first and second bores extending from said chamber, first and second pistons within said bores respectively and spring-loaded towards the chamber, means for supplying lubricant to the chamber, a passage extending from the second bore and arranged to be normally covered by the second piston, but to be uncovered when the second piston is moved against its spring, said passage communicating with the first bore on the side of the first piston remote from the chamber and being arranged to be covered by the first piston when it is moved against the action of its spring, and one or more further passages extending from the second bore and adapted to communicate with said machine, the arrangement being such that, in use, the first piston is depressed before the second piston.

The accompanying drawing is a sectional view illustrating one example of the invention.

Referring to the drawing, there is provided a body 1 within which is defined a chamber 2 to which lubricant is supplied from a source 3 by a constant delivery pump 4. Extending from the chamber 2 is a first bore 5 within which is contained a piston 6. The piston 6 is loaded by a spring 7 towards the chamber 2, whilst the end of the bore 5 remote from the chamber is connected to the upstream side of the pump 4 through a pipe 8. Further, the bore is stopped intermediate its ends to define a shoulder 9 serving to limit movement of the piston 6 against the action of its spring 7.

Also extending from the chamber 2 is a second bore 10 which is initially stepped to define a truncated conical shoulder 11 between the chamber 2 and bore 10. Within the bore 10 is a piston 12 which is loaded by a spring 13 towards the shoulder 11 and on its face presented to the chamber 2 is provided with a half-ball valve 14 adapted to seat against the shoulder 11.

Extending from the bore 10 is a passage 15 which communicates with the bore on the side of the piston 6 remote from the chamber 2. The passage 15 is normally closed by the valve 14. Also extending from the bore 10 are passages 16 which communicate with the machine or machines to which lubricant is to be supplied.

In operation, when the pump 4 is started, lubricant is supplied to the chamber 2. The relative areas of the pistons 6, 12 presented to the chamber 2 are so chosen that the first effect of the lubricant will be to move the piston 6 against its spring 7 until such movement is arrested by the shoulder 9. In this position the piston 6 covers the passage 15. The pressure in the chamber 2 now rises to a value sufficient to move the piston 12 against the spring 13. The first effect of this will be to uncover the passage 15 and allow lubricant to flow into the latter. Further movement of the piston 12 uncovers the passages 16 and allows lubricant to be supplied to the machine or machines. As soon as the passages 16 are uncovered the pressure in the chamber 2 drops and the piston 6 is moved by its spring 7 to maintain the pressure. However, when the passage 15 between the bores 5, 10 is uncovered by piston 6, the pressure acting on the piston 12 drops and it is moved onto its seating 11, and the cycle is repeated.

A system in accordance with the invention may be used whenever it is required to supply lubricant intermittently to a machine. One particular application of the example described is in the lubrication of the pumps employed in a reheat system of a gas turbine engine. In this case the reheat system is not continuously in operation and in order to avoid waste of lubricant the passage 15 is provided with a branch pipe 17 which communicates with the source 3 through a normally open valve 18 which is closed by a solenoid 19 when the reheat system is operative.

Having thus described my invention what I claim as new and desire to secure by Letters Patent is:

Means for intermittently supplying lubricants under pressure to a machine and comprising a chamber, first and second bores extending from said chamber, first and second pistons within said bores respectively, first and second springs loading said pistons towards the chamber respectively, means for supplying lubricant to the chamber, a first passage extending from the second bore and arranged to be normally covered by the second piston, but to be uncovered when the second piston is moved against the action of the second spring, said first passage communicating with the first bore on the side of the first piston remote from the chamber and being arranged to be covered by the first piston when it is moved against the action of the first spring, and a further passage extending from the second bore for communication with said machine, said further passage being arranged to be normally covered by the second piston, but to be uncovered when the second piston is moved against the action of the second spring after the first passage is uncovered, the ratio of the effective areas of the first and second pistons acted upon by pressure in the chamber being greater than the ratio of the forces exerted on the pistons by the first and second springs respectively, so that the first piston is depressed before the second piston as the pressure in the chamber increases.

No references cited.